(12) United States Patent
Slezak (10) Patent No.: US 6,252,738 B1
(45) Date of Patent: *Jun. 26, 2001

(54) SPINDLE MOTOR HAVING A TAPER FOR HEAT SHRINK CLAMP RING

(75) Inventor: Arnold George Slezak, Thousand Oaks, OK (US)

(73) Assignee: Seagate Technologies LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,616

(22) Filed: Mar. 1, 1999

(51) Int. Cl.[7] .................................................. G11B 17/02
(52) U.S. Cl. ...................................... 360/98.08; 360/99.12
(58) Field of Search .............................. 360/98.08, 99.12; 29/603.03

(56) References Cited

U.S. PATENT DOCUMENTS

| | | | |
|---|---|---|---|
| 5,136,450 | * 8/1992 | Moir | 360/135 |
| 5,293,282 | * 3/1994 | Squires et al. | 360/77.08 |
| 5,485,328 | * 1/1996 | Radwan et al. | 360/98.08 |
| 5,485,331 | * 1/1996 | Dunfield et al. | 360/99.08 |
| 5,493,462 | * 2/1996 | Peter | 360/99.12 |
| 5,548,457 | * 8/1996 | Brooks et al. | 360/98.08 |
| 5,555,144 | * 9/1996 | Wood et al. | 360/98.08 |
| 5,600,512 | * 2/1997 | Radwam et al. | 360/98.08 |
| 5,724,208 | * 3/1998 | Yahata | 360/98.01 |
| 5,732,458 | * 3/1998 | Moir et al. | 29/603.3 |
| 5,838,516 | * 11/1998 | Staggers et al. | 360/98.08 |
| 5,969,902 | * 10/1999 | Okumura et al. | 360/99.08 |
| 6,028,739 | * 2/2000 | Lindrose | 360/99.12 |
| 6,055,123 | * 4/2000 | Kazmierczak et al. | 360/98.08 |
| 6,185,067 | * 2/2001 | Chamberlain | 360/99.08 |

* cited by examiner

*Primary Examiner*—David L. Ometz
*Assistant Examiner*—Franklin D. Altman, III
(74) *Attorney, Agent, or Firm*—Merchant & Gould P.C.

(57) ABSTRACT

Embodiments of this invention are directed to a disc drive assembly having a housing including a base section and a top section, wherein the base section and the top section mate to form an internal environment. The disc drive assembly further includes a hub assembly motor having a hub, wherein the hub is a cylindrical member having a first end and a second end and wherein the first end is tapered. The hub is further capable of supporting a storage data disc. Additionally, in preferred embodiments, at least one head capable of reading the data storage disc disposed within the internal environment of the housing.

14 Claims, 5 Drawing Sheets

SPINDLE MOTOR HAVING A TAPER FOR HEAT SHRINK CLAMP RING

FIELD OF THE INVENTION

This invention is related to disc drive assemblies; and in preferred embodiments, to a motor for use in disc drives, wherein the hub of the motor includes a tapered edge for improved retention of a clamp ring.

BACKGROUND OF THE INVENTION

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Figure 1:
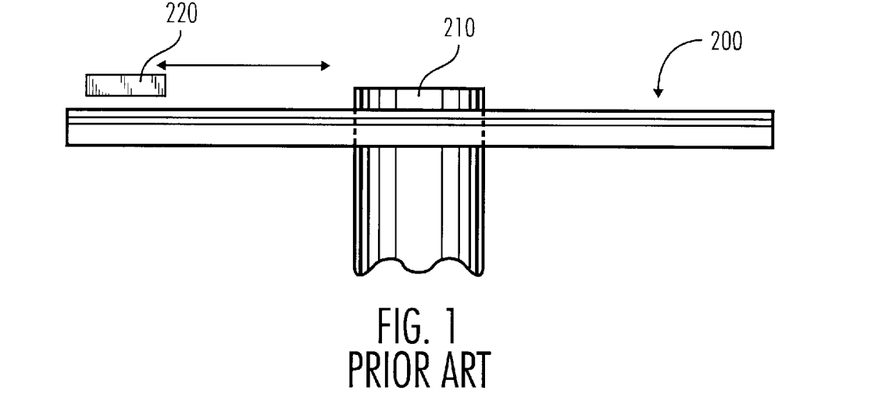
FIG. 1 is a side view of portions of a conventional disc drive system and recording disc.

Conventional disc drive systems typically include one or more recording discs supported for relatively high speed rotation on a rotary spindle. For example, FIG. 1 shows a side view of portions of a conventional disc drive system, including a conventional data storage or recording disc 200 supported on a spindle 210. A disc drive motor (not shown) is operatively coupled to the spindle 210 for rotation of the spindle and the disc supported thereon. A recording and/or reading head 220 is supported by suitable head support structure (not shown) adjacent the recording surface of the disc. To simplify the disclosure, FIG. 1 is shown with a single recording disc 200 having a single recording surface and a single head 220. However, other conventional disc drive systems employ multiple discs, double-sided discs (discs with recording surfaces on both surfaces) and multiple heads.

Figure 2:
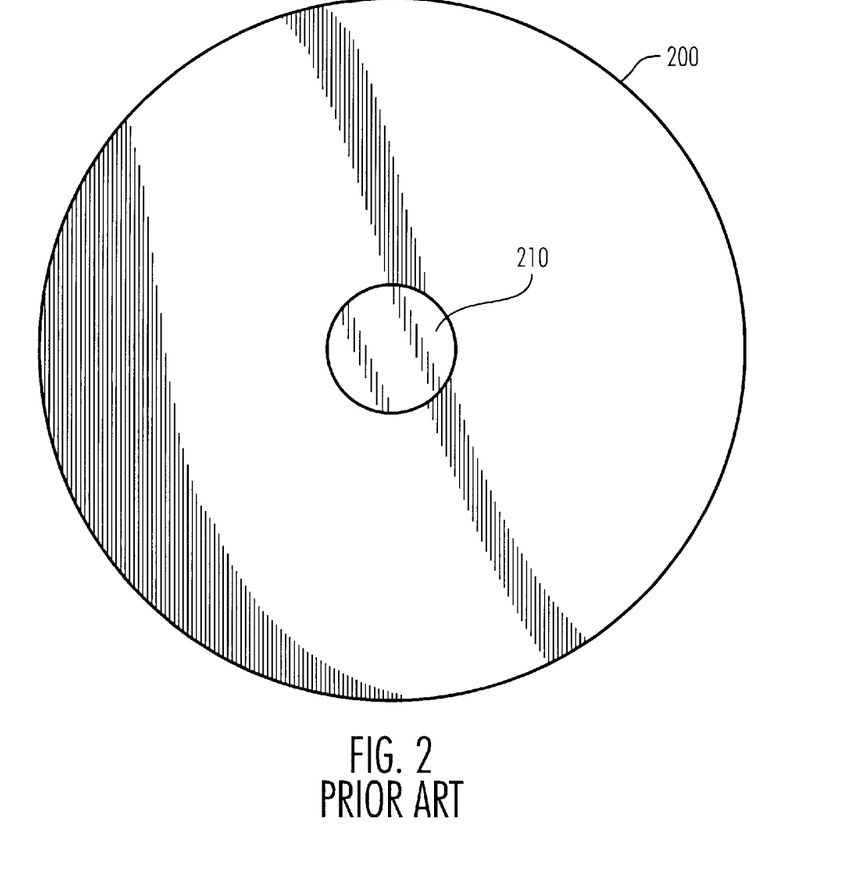
FIG. 2 is a top view of the recording disc and spindle of the system shown in Figure 1.

As shown in FIG. 1, the disc 200 has a central hub opening through which the spindle 210 extends. The disc 200 and spindle 210 are shown in a top view in FIG. 2. The spindle 210 extends through a central opening, which defines an inside diameter, of the disc. The disc is secured at its inner diameter (ID), in a fixed relation with the spindle 210, and is supported such that the outer diameter (OD) portion of the disc is free from contact with other components. In this regard, the disc is clamped at its ID to the spindle 210 and is free at its OD. When the spindle 210 is rotatably driven, the disc 200 is caused to rotate with the spindle 210. A top (not shown) which provides a protective cover for the disc is attached through the top of the spindle 210 and provides support for the spindle 210.

Typically, multiple open-center discs and spacer rings are alternately stacked on a spindle motor hub. The hub, defining the core of the stack, is cylindrical in shape and serves to align the discs and spacer rings around a common axis. The discs are secured to the hub by an annular clamp that fits over the hub. Collectively the discs, spacer rings and spindle motor hub define a disc pack assembly.

The surfaces of the stacked discs are accessed by the read/write heads which are mounted on a complementary stack of actuator arms which form a part of an actuator assembly. Generally, the actuator assembly has an actuator body that pivots about a pivot mechanism disposed in a medial portion thereof. A motor selectively positions a proximal end of the actuator body. This positioning of the proximal end in cooperation with the pivot mechanism causes a distal end of the actuator body, which supports the read/write heads, to move radially across the recording surfaces of the discs, such that the head may be selectively positioned adjacent any recording location on the recording surface as the disc is rotated.

In operation, the head 220 is moved in the radial direction to align or register with a desired track location on the recording surface of the disc. Once aligned or registered with the desired track location, the head 220 is operated to read or write information onto the recording surface at the desired track location. It is important to properly register the head 220 with the track location to effect accurate reading or writing operations on the registered track.

To assure that proper registration of the disc for reading and writing purposes can be achieved, the discs must not dislodge and move in the axial direction or the horizontal plane once they are positioned in the disc stack. Thus, the discs must be protected from nonoperational shock. Typically, the disc stack is susceptible to axial disc movement during handling, shipping and installation. In addition to nonoperational shock, the discs must be prohibited from axial movement during spinning as this could damage the head or cause it to misalign with the track it is currently reading.

Current systems use a clamp ring to secure the discs in place on the hub. The clamp ring is placed over the hub at the top of the disc stack. Various prior art systems have employed hub and clamp ring configurations such as that shown in the exploded view of FIG. 1, wherein a clamp ring is clamped onto a cylindrical hub by thermal contraction. However, in current systems, the clamp rings in such prior configurations have exhibited a tendency to slip off of the hub in high shock, thereby increasing the likelihood that the discs will move out of alignment on the hub. As such, a need in the industry exists for a cost effective system, apparatus and process that will increase disc protection from nonoperational shocks and movement.

SUMMARY OF THE DISCLOSURE

Preferred embodiments of the instant invention are directed to a disc drive assembly for stacking discs, wherein the disc drive assembly includes a hub assembly which is configured to secure the discs on the disc stack. Embodiments of the disc drive assembly includes a housing having a base section and a top section, wherein the base section and the top section mate to form an internal environment.

The disc drive assembly further includes a motor having a hub assembly including a hub, wherein the hub is a cylindrical member having a first end and a second end and wherein the first end is tapered and a cylindrical central section for supporting at least one, and preferably, multiple storage data discs.

To read and write to the discs, in preferred embodiments, at least one head is disposed within the internal environment of the housing. The head is positioned adjacent the disc recording surface and is capable of moving in a radial direction across the recording surface of the disc.

Preferred embodiments include a tapered hub. One advantage of this feature is that the taper can minimize the risk that the heat shrink clamp will slip off of the hub, and minimize the risk that the discs will move along the axial length or rolling in the horizontal plane of the hub.

Still other preferred embodiments include indents at the top surface of the hub. An advantage of this feature is that the clamp ring can be more easily removed from the disc pack assembly through the use of a tool.

Another feature of preferred embodiments is the use of a heat shrink clamp to secure the discs in place on the taper. An advantage of this feature is that the contact point at the clamp to hub interface will always occur at the top of the clamp; thus, creating a more predictable loading of the disc pack during the clamp installation process. A further advantage is that the heat shrink clamp is capable of clamping a relatively high load. A still further advantage is that the heat shrink clamp protects the discs from nonoperational shocks, such as, shocks caused by handling, shipping and installing.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

Figure 3:
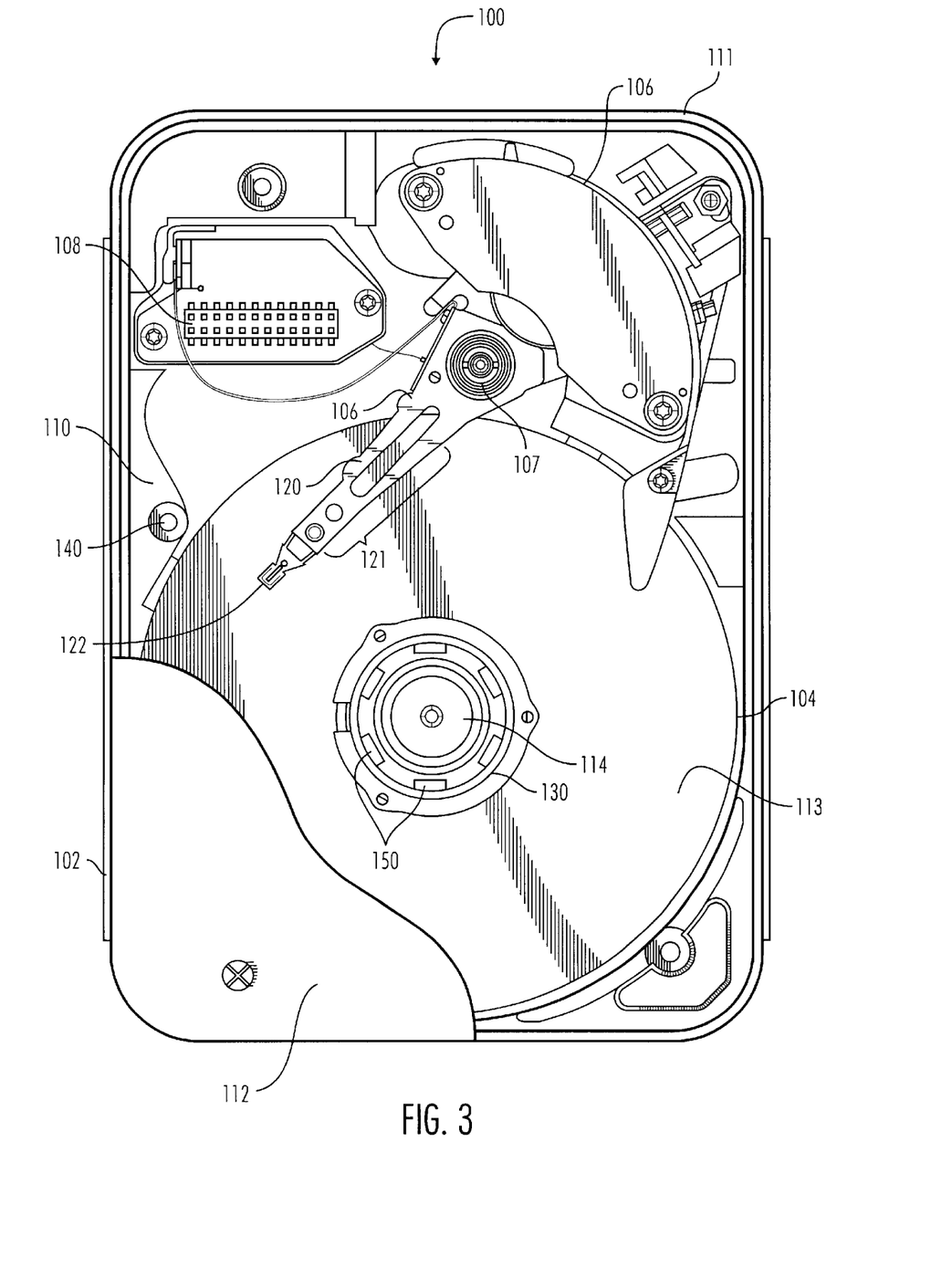
FIG. 3 is a top view of a preferred embodiment of a disc drive assembly.

FIG. 3 is a top view of a disc drive apparatus 100 including a disc arrangement according to a preferred embodiment of the instant invention. As shown in FIG. 3, the disc drive apparatus 100 includes a housing 102, at least one data storage disc 104, a head-arm assembly 106 which resides adjacent the data storage disc 104 and a controller 108 (partially shown). FIG. 3 is a top plan view of the disc drive apparatus 100, wherein a top portion of the apparatus 100 has been cut-away to expose a head-arm assembly 106 positioned over the data storage disc 104. It will be understood that numerous details of construction of the disc drive 100 are not included in the following description, as such, they are well known to those skilled in the art and are believed to be unnecessary for the purpose of describing the present invention.

The housing 102 includes a base section 110 and a top section 112, wherein the base section 110 is configured to support the data storage disc 104 and the head-arm assembly 106. The top section 112, coupled with the base section 110 and a perimeter gasket 111, provide a sealed internal environment for the disc drive 100.

The data storage disc 104 includes a recording surface 113 and defines, for example, concentric circular data tracks (not shown). Alternatively, the recording surface 113 may define a spiral track configuration. The recording surface 113 is capable of receiving and/or storing information for later use.

A spindle motor 114, encased, in part, by a hub assembly 130, is mounted to the base section 110. The data storage discs 104, which are centered open discs, are mounted around a hub 132 of the hub assembly 130 and secured by a heat shrink clamp 118 for rotation at a constant half speed. Indeed, the motor 114 spins, thereby rotating the disc 104 during use. Typically, the motor 114 is capable of spinning between 7200 to at least 20,000 rpms.

Adjacent the disc 104 is a head-arm assembly 106 which pivots on a pivot spindle assembly 107. The head-arm assembly 106 includes an arm 120, a suspension member 121 and a read/write head 122, wherein the head 122 is positioned over the data storage disc 104 at one end of the suspension member 121. The suspension member 121 can be moved across the recording surface 113 of the disc 104, thereby allowing the head 122 to be moved across the recording surface 113 such that the information on the disc 104 can be read.

A plurality of storage discs 104 may be arranged in a stack, supported on the motor 114. A plurality of heads are supported on a head-arm assembly 106 coupled together in an E-block structure, to access the discs 104 simultaneously, wherein each head accesses one of two surfaces (top and bottom) of each disc 104.

The movement of the head-arm assembly 106 is controlled by the controller 108. The controller 108 is coupled to the base section 110 and is in electronic communication with the components of further disc drive apparatus 100. The controller 108 comprises any suitable means capable of controlling the components of the disc drive, such as, the motor 114 and the head-arm assembly 106. In one preferred embodiment, the controller is an integrated circuit board.

Figure 4:
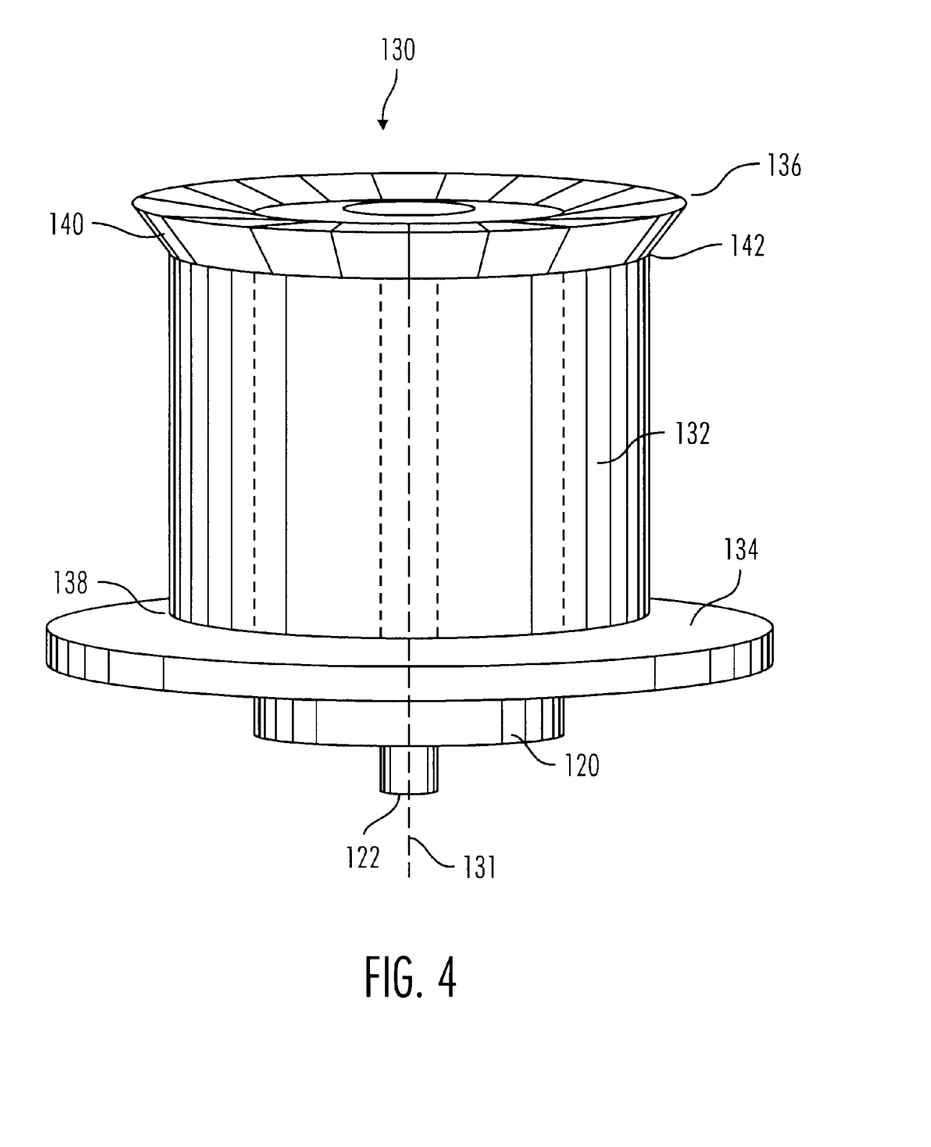
FIG. 4 is a side view of a preferred embodiment of the hub assembly.

With reference to FIG. 4, the hub assembly 130 includes a hub 132, a rotor 120 of the motor and a spindle 122. The rotor 120, in conjunction with a stator (not shown) mounted on the base section 110 (FIG. 3) comprise the motor 114 for spinning the hub and disc stack, as discussed above. The spindle 122 of the hub 132 comprises a cylindrical member that passes through the bore of the rotor 120 and extends into the interior of the hub. The spindle is coupled to the base section 110 of the housing 102, thereby mounting the hub and rotor into the base section 110. During the spinning of the motor 114, the spindle 122 remains stationary relative to the base section 110.

The hub 132 is configured to accept a heat shrink clamp 118 for securing the discs from movement that can misalign the discs. The hub 130 encases a portion of the spindle 122 and comprises a partially hollow, generally cylindrical member defining a central axis 131 and having a flange 134, a first end 136 and a second end 138, wherein the flange 134 is adjacent the second end 138. In preferred embodiments, the hub 132 is made from aluminum, although any other embodiments may employ other suitable nonmagnetic materials.

The first end 136 of the hub 132 includes a tapered section 140 extending along a portion of the axial length of the hub 132. The tapered section 140 defines a partial inverted cone and extends from the first end 136 of the hub to a taper end point 142 on the axial length of the hub 130. The diameter of the tapered section 140 diverges from the first end 136, at which the diameter is the greatest, along a portion of the axial length of the hub 132, along which the diameter of the taper 140 decreases in the direction toward the end point 142. As such, the hub 132 defines a first diameter at the first end 136, a second diameter at the second end 138 and a decreasing diameter from the first end 136 to the end point 142 along the axial length of the hub 132, wherein the second diameter is smaller than the first diameter, and wherein the decreasing diameter is larger than the diameter at the second end 138. The diameter of the hub 132 between the end point 142 and the flange 134 remains relatively constant. The portion of the hub 132 between the end point 142 and flange 134, therefore, defines a cylindrical section for supporting one or more discs. The amount of the taper of the tapered section 140, that is, the diameter of the cross section per inches in height, depends, in part, on the amount of expansion of contraction that is characteristic of the material of the clamp 118. For instance, in one preferred embodiment, the amount of taper is 0.0005"(0.0127 millimeter) per 0.040"(1.016 millimeter) of height of the hub. In other preferred embodiments, the amount of taper ranges from 0.0005"(0.0127 millimeter) to 0.0020"(0.0508 millimeter) per 0.040"(10.16 m) in height.

Figure 5:
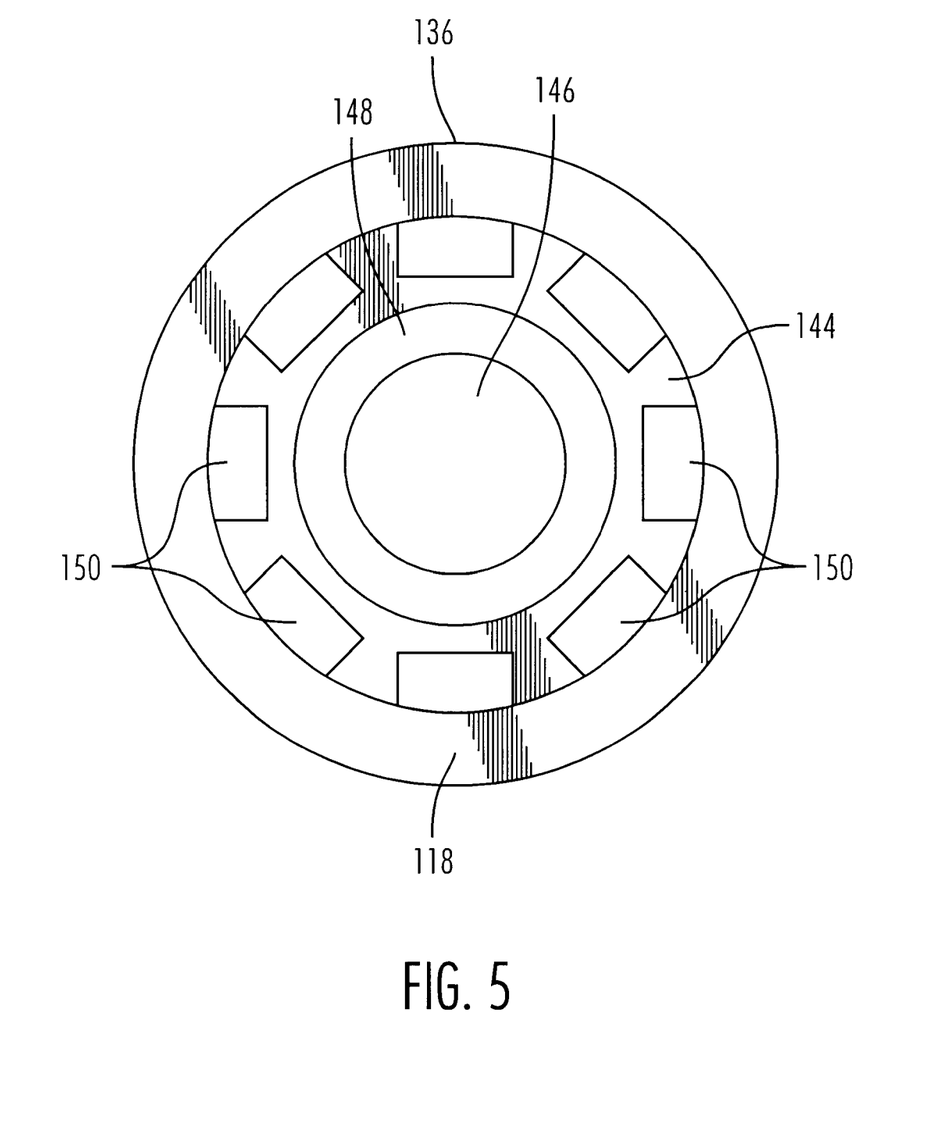
FIG. 5 is a top view of the first end of the hub as shown in the hub assembly of FIG. 3.

FIG. 5 is a top view of the first end 136 of the hub 132. As shown in FIG. 5, the first end 136 includes a top surface 144 having a center portion 146, an annular groove 148 and indents 150. In some preferred embodiments, the top surface 144 does not include an annular groove 148, but rather, the center portion 146 extends radially outward to the indents 150. The purpose of the annular groove is to minimize the hub distortion due to the fact that the bearing assembly, which is normally steel, and the hub, which is normally aluminum, both have a different thermal coefficient of expansion.

Figure 6:
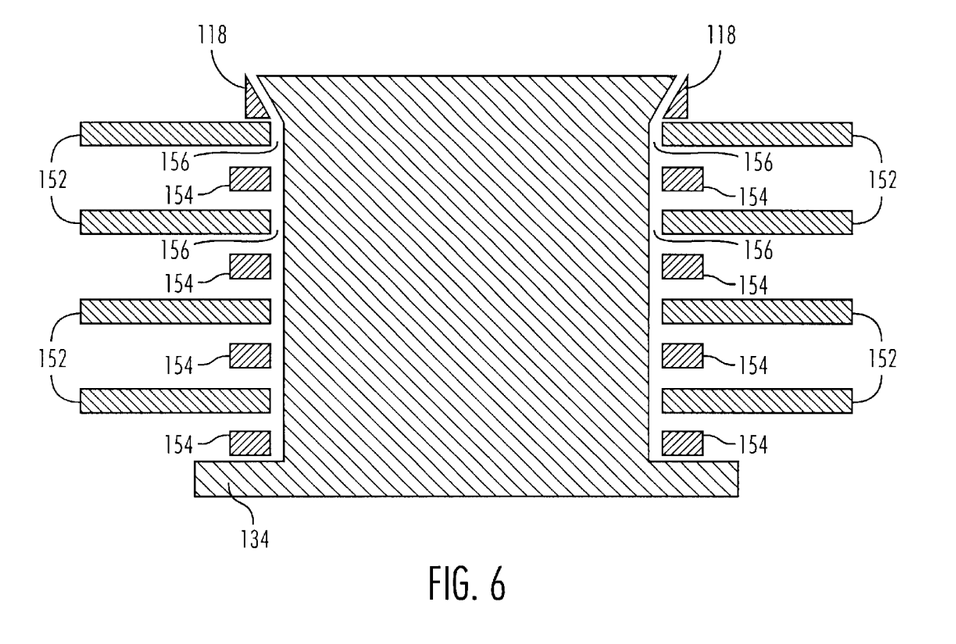
FIG. 6 is a cross section of a hub assembly including a disc pack, spacers and a heat shrink clamp.

FIG. 6 illustrates a preferred embodiment of a disc assembly comprising the hub assembly 130 and a disc stack with spacer rings. As depicted in FIG. 6, a plurality of open-centered discs 152 are disposed around the diameter of the hub 132. In preferred embodiments, the discs 152 do not reside against the hub 132, but rather, a spacing 156 is maintained between the center of disc 152 and the hub 132. The spacing 156 between the discs and the hub is again for the purpose of minimizing thermally induced distortion of the discs since the hub has a radial coefficient of expansion that is similar to the inner portion that is made from steel. The discs are made from aluminum.

The disc stack further includes spacers 154 which are placed between each of the discs 152 such that each disc 152 is separated from the adjacent discs 152. The spacers 154 comprise annular rings having an inner diameter and an outer diameter, wherein the diameter of the open center of the disc 152 is approximately equivalent to the inner diameter of the spacer 154. The spacers are made from aluminum, although other embodiments may employ other suitable nonmagnetic materials.

The arrangement of alternating discs 152 and spacers 154 are stacked until the desired number of discs 152 are placed on the hub 132. In preferred embodiments, the disc 152 and spacer 154 stack does not exceed above the first end 136 of the hub 132 and does not exceed below the end point 142. Once the discs 152 are stacked a heated and thermally expanded heat shrink clamp 118 is placed over the first end 136 of the hub 134, adjacent the tapered section 140 and is cooled and thermally contracted to secure the discs 152 and spacers 154 in place.

The heat shrink clamp 118 comprises an annular ring, wherein, at room temperature, the diameter of the clamp 118 is smaller than the diameter of the first end 136. The clamp 118 is made from any material capable of thermally expanding when heated, for example, to about 400° F. (204.4° C.), and thereafter thermally contracting, upon cooling, substantially back to its original diameter, wherein the original annular shape is maintained. With reference to FIGS. 5 and 6, the clamp 118 is placed around the outer perimeter of the taper 140.

To place the clamp 118 around the taper 140, in a preferred embodiment, the clamp 118 is heated to approximately 400° F. During heating, the clamp 118 thermally expands to define an inner diameter larger than the diameter of the first end 136 of the hub 134. In its expanded state, the clamp 118 is positioned over the tapered section 140 at the first end 136 and slid downward towards the end point 142. As the clamp 118 cools, for example, during the step of sliding the clamp over the tapered section, the clamp thermally contracts and shrinks onto the hub 132. As the diameter of the clamp 118 contracts to a diameter smaller than the diameter of the first end 136, the risk of the clamp 118 slipping over the first end is minimized. Further, the heating and cooling of the clamp 118 changes the modulus of elasticity such that the clamp 118 is more rigid, and thus, less susceptible to stretching following the coding process. As such, it is less likely that the clamp 118 will slip over the first end 136.

In operation, a user, such as a disc drive manufacturer, assembles the disc pack assembly. As stated above, the disc pack assembly comprises the discs, the spacers and the hub assembly. Initially, a determination is made regarding the number of discs to be packed.

The user places a first spacer over the hub 132 against the flange 134. A disc 152 is then placed over the hub 132 against the first spacer. A second spacer is then placed on top of the first disc, followed by a second disc 152. This procedure of alternating discs 152 and spacers is continued until the desired number of discs 152 are packed on the hub.

Once the desired number of discs 152 are packed, a heat shrink clamp 118 is heated to about 400° F. (204.4° C.) and stretched over the tapered section 140. The clamp 118 is moved downward towards the end point 142. As the clamp 118 is placed over the taper 140, it cools and shrinks over the taper adjacent the end point 142. The diameter of the clamp 118 contracts to a diameter smaller than the diameter of the first end 136, that is, the largest diameter of the tapered section 140. As the diameter is smaller than the diameter at the top of the tapered section 140, the risk of the clamp 118 slipping over the taper 140 and off of the hub 132 is minimized.

To remove the clamp 118 from the hub 132, a tool is inserted into the indents 150 to contact and spread or stretch the clamp 118 to a diameter of sufficient to allow the clamp to be lifted over the taper 140. In some preferred embodiments, the clamp 118 is heated such that it thermally expands to a diameter greater than that of the tapered section 140.

In another preferred embodiment, a synthetic resin polymer tube or sleeve is placed around the hub 132. In one preferred embodiment, the synthetic resin polymer material is Teflon™. In preferred embodiments, the Teflon™ is held in place without adhesives for example by quickly stretching and retracting the tube around the hub 132, such that there is no cold flow of the Teflon™. The Teflon™ allows the discs 152 to be easily slid into the hub 132. In other preferred embodiments, the tube or sleeve may be made of other materials, such as, but not limited to polymid and polyester are also suitable.

Therefore, based on the above, a disc drive assembly having a hub assembly according to a preferred embodiment of the invention comprise a housing including a base section and a top section, wherein the base section and the top section mate to form an internal environment. The disc drive assembly further includes a motor having a hub, wherein the hub is a cylindrical member having a first end and a second end and wherein the first end is tapered. The hub is further capable of supporting a storage data disc. Additionally, in preferred embodiments, at least one head capable of reading the data storage disc disposed within the internal environment of the housing.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive assembly while maintaining substantially the same functionality without department from the scope and spirit of the present invention. In addition, although the preferred embodiment described herein is directed to a hydrodynamic motor, it will be appreciated by those skilled in the art that the teachings of the present invention can be applied to other systems without departing from the scope and spirit of the present invention.

What is claimed is:

1. A disc drive apparatus comprising:
   a housing including a base section and a top section, wherein the base section and the top section mate to form an internal environment;
   a hub comprising a cylindrical member having a first diameter and a tapered end that has a top surface, the top surface defining a plurality of indents therein, wherein the tapered end is tapered from a second diameter adjacent to the top surface to the first diameter of the cylindrical member, the second diameter being larger than the first diameter, wherein the hub is capable of supporting at least one storage disc about the cylindrical member within the internal environment of the housing, the storage disc having a planar surface; and
   a continuous removable clamp ring positioned around the tapered end of the hub, the clamp ring having an interior surface, a bottom surface, and an internal diameter that is larger than the second diameter when the clamp ring is heated and smaller than the second diameter when the clamp ring is cooled, the clamp ring being positioned on the hub by being fitted over the second diameter of the tapered end when the clamp ring is heated, the interior surface of the clamp ring contracting against the tapered surface as the clamp ring cools to force the bottom surface of the clamp ring into coplanar contact with the planar surface of the storage disc to generate a uniformly distributed axial load on the disc to secure the storage disc about the cylindrical member, wherein the clamp ring can be removed from the hub by application of outward force applied through the indents against the clamp ring.

2. A disc drive apparatus as claimed in claim 1, further comprising the at least one storage disc disposed around the circumference of the cylindrical member of the hub.

3. A disc drive apparatus as claimed in claim 1, further comprising a hydrodynamic motor.

4. A disc drive apparatus as claimed in claim 1, wherein the taper on the tapered end of the hub is between 0.0005" (0.0127 mm) taper per 0.040" (1.016 mm) height of the hub and 0.002" (0.0508 mm) taper per 0.040" (1.016 mm) height of the hub.

5. A disc drive apparatus as claimed in claim 1, wherein the taper on the tapered end of the hub is 0.0005" (0.0127 mm) taper per 0.040" (1.016 mm) height of the hub.

6. The disc drive apparatus of claim 1 wherein elasticity of the clamp ring changes when cooled to prevent the clamp ring from expanding to exceed the second diameter and slipping off the hub without the outward force.

7. A disc drive assembly for reading and writing data storage discs comprising:
   a housing including a base section and a top section wherein the base section and top section mate such that a sealed internal environment is formed;
   a hydrodynamic or ball bearing motor having a hub, the hub comprising a cylindrical member having a first diameter and a tapered end, wherein the tapered end has a top surface defining a plurality of indents therein, and wherein the first end of the hub tapers from a second diameter adjacent to the top surface to the first diameter of the cylindrical member, the second diameter being larger than the first diameter and the motor being disposed within the internal environment of the housing, wherein the motor is coupled to the base section and the top section is disposed above the motor, such that a spacing is formed between the motor and the top section; and
   a disc pack assembly, holding at least one storage disc, fastened on the hub by a continuous removable clamp ring positioned around the tapered end of the hub, the clamp ring having an interior surface, a bottom surface, and an internal diameter that is larger than the second diameter when the clamp ring is heated and smaller than the second diameter when the clamp ring is cooled, the clamp ring being positioned on the hub by being fitted over the second diameter of the tapered end when the clamp ring is heated, the interior surface of the clamp ring contracting against the tapered surface as the clamp ring cools to force the bottom surface of the clamp ring into coplanar contact with a planar surface of the storage disc to generate a uniformly distributed axial load on the storage disc to secure the disc about the cylindrical member, wherein the clamp ring can be removed from the hub by application of outward force applied through the indents against the clamp ring.

8. A disc drive apparatus as claimed in claim 7, further comprising the at least one storage disc disposed around the circumference of the cylindrical member of the hub.

9. A disc drive apparatus as claimed in claim 7, wherein the at least one data storage disc is a plurality of discs.

10. A disc drive apparatus as claimed in claim 7, wherein the taper on the tapered end of the hub is between 0.0005" (0.0127 mm) taper per 0.040" (1.016 mm) height of the hub and 0.002"(0.0508 mm) taper per 0.040"(1.016 mm) height of the hub.

11. A disc drive apparatus as claimed in claim 7, wherein the taper on the tapered end of the hub is 0.0005" (0.0127 mm) taper per 0.040" (1.016 mm) height of the hub.

12. The disc drive apparatus of claim 7 wherein elasticity of the clamp ring changes when cooled to prevent the clamp ring from expanding to exceed the second diameter and slipping off the hub without the outward force.

13. A disc drive apparatus comprising:
   a housing including a base section and a top section, wherein the base section and the top section mate to form an internal environment;

a hub comprising a cylindrical member having a first diameter and a tapered end that has a top surface, wherein the tapered end is tapered from a second diameter adjacent to the top surface to the first diameter of the cylindrical member, the second diameter being larger than the first diameter, wherein the hub is capable of supporting at least one storage disc about the cylindrical member within the internal environment of the housing, the storage disc having a planar surface; and a continuous heat shrink clamp ring positioned around the tapered end of the hub, the heat shrink clamp ring having an interior surface, a bottom surface, and an internal diameter that is larger than the second diameter when the heat shrink clamp ring is heated and smaller than the second diameter when the heat shrink clamp ring is cooled, the heat shrink clamp ring being positioned on the hub by being fitted over the second diameter of the tapered end when the heat shrink clamp ring is heated, the interior surface of the heat shrink clamp ring contracting against the tapered surface as the clamp ring cools to force the bottom surface of the clamp ring into coplanar contact with the planar surface of the storage disc to generate a uniformly distributed axial load on the storage disc to secure the disc about the cylindrical member.

14. The disc drive apparatus of claim 13 wherein elasticity of the heat shrink clamp ring changes when cooled to prevent the heat shrink clamp ring from expanding to exceed the second diameter and slipping off the hub without application of a radially outward force.

* * * * *